United States Patent
Fay et al.

(10) Patent No.: US 12,429,609 B2
(45) Date of Patent: Sep. 30, 2025

(54) VEHICLE STATE ESTIMATION SYSTEM AND METHOD

(71) Applicant: Rivian IP Holdings, LLC, Plymouth, MI (US)

(72) Inventors: Gary Lindsay Fay, Hermosa Beach, CA (US); Kuangmin Li, San Jose, CA (US); Sameer Kolte, Santa Clara, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 280 days.

(21) Appl. No.: 18/139,050

(22) Filed: Apr. 25, 2023

(65) Prior Publication Data
US 2024/0085574 A1   Mar. 14, 2024

Related U.S. Application Data

(60) Provisional application No. 63/405,236, filed on Sep. 9, 2022.

(51) Int. Cl.
*G01S 19/49* (2010.01)
*G01S 19/39* (2010.01)

(52) U.S. Cl.
CPC ............ *G01S 19/49* (2013.01); *G01S 19/396* (2019.08)

(58) Field of Classification Search
CPC ........ G01S 19/49; G01S 19/396; G01S 19/42; G01S 19/47; G01C 21/30; G01C 21/165
See application file for complete search history.

(56) References Cited

U.S. PATENT DOCUMENTS

| | | | | |
|---|---|---|---|---|
| 7,702,460 B2 * | 4/2010 | Liu | ........................ | G05D 1/104 342/357.31 |
| 2011/0257882 A1 * | 10/2011 | McBurney | .............. | G01S 19/47 701/532 |
| 2015/0039224 A1 * | 2/2015 | Tuukkanen | ........... | H04W 4/021 701/500 |
| 2015/0219767 A1 * | 8/2015 | Humphreys | .......... | G01S 19/485 342/357.26 |
| 2016/0097862 A1 * | 4/2016 | Yim | ........................ | G01S 19/49 701/472 |
| 2019/0368881 A1 * | 12/2019 | Bobye | ...................... | G01S 19/07 |
| 2022/0042802 A1 * | 2/2022 | Saini | ..................... | G01C 21/188 |
| 2023/0027369 A1 * | 1/2023 | Schmitt | ................... | H04W 4/46 |
| 2025/0164649 A1 * | 5/2025 | Jia | ........................... | G01S 19/49 |

* cited by examiner

*Primary Examiner* — William Kelleher
*Assistant Examiner* — Kenneth W Good
(74) *Attorney, Agent, or Firm* — Haley Guiliano LLP

(57) ABSTRACT

Systems and methods are provided for providing reliable positioning data for a vehicle. Satellite positioning data is determined using a satellite positioning module. Based on the satellite positioning data, a first dead reckoning module is periodically reset at a first interval and a first dead reckoning module is periodically reset at a second interval offset from the first interval. The satellite positioning data is compared to first dead reckoning positioning data of the first dead reckoning unit and to second dead reckoning positioning data of the second dead reckoning unit, and the satellite positioning data, the first dead reckoning positioning data, or the second dead reckoning positioning data is selected as a vehicle position based on the comparison.

20 Claims, 5 Drawing Sheets

VEHICLE STATE ESTIMATION SYSTEM AND METHOD

CROSS-REFERENCE TO RELATED APPLICATION

This application claims priority to U.S. Provisional Patent Application No. 63/405,236, filed on Sep. 9, 2022, the entire contents of which is hereby expressly incorporated by reference herein in its entirety.

INTRODUCTION

The present disclosure is directed to providing reliable positioning data for autonomous or semi-autonomous vehicles, and, more particularly, to providing reliable positioning data by monitoring global navigation satellite system (GNSS) data.

SUMMARY

In some approaches, to enable autonomous or semi-autonomous driving, positioning data (e.g., position, velocity, and altitude data) is provided by a GNSS system (e.g., GPS, BDS, Galileo, GLONASS, etc.) fused with an inertial measurement unit (IMU) and/or other sensor data. For example, GNSS data may be fused with IMU data to provide a vehicle state estimate (VSE) in a loosely, tightly, or deeply coupled fashion. However, if GNSS data is corrupted by interference (e.g., by multi-path interference by nearby buildings) or by a hardware failure, the determined positioning information may not be suitable to enable autonomous or semi-autonomous driving (e.g., Society of Automotive Engineers (SAE) level two and above). Consequently, what is needed are techniques for providing reliable positioning information under a variety of environmental conditions and hardware failure situations.

In accordance with the present disclosure, systems and methods are provided using two separate dead reckoning modules that receive periodic resets from a GNSS+IMU fused output (e.g., a positioning solution) or internal navigation system (INS)-aided GNSS output. Although a GNSS+IMU fused output is discussed, it should be understood that GNSS data may be fused with data from other sensors (e.g., wheel speed sensors, steering angle sensors, etc.). By staggering these resets and by comparing the GNSS+IMU fused output (e.g., VSE sensor fusion) to the output (e.g., positioning solution) of each of the two dead reckoning modules (e.g., which may rely on all of the sensors without GNSS), a GNSS data error may be detected, regardless of when it occurs with respect to the periodic resets.

The method includes determining, using a satellite positioning module, satellite positioning data; periodically resetting a first dead reckoning module, at a first interval, based on the satellite positioning data; and periodically resetting a second dead reckoning module, at a second interval offset from the first interval, based on the satellite positioning data. The method further includes comparing the satellite positioning data to first dead reckoning positioning data of the first dead reckoning module and to second dead reckoning positioning data of the second dead reckoning module, and selecting the satellite positioning data, the first dead reckoning positioning data, or the second dead reckoning positioning data as a vehicle position based on the comparison.

In some embodiments, determining the satellite positioning data may include fusing data from a GNSS module with data from at least one of an IMU, a wheel speed sensor, and a steering angle sensor to determine the satellite positioning data.

In some embodiments, after resetting the first dead reckoning module, the first dead reckoning positioning data may not be based on the GNSS module. In some embodiments, after resetting the second dead reckoning module, the second dead reckoning positioning data may not be based on the GNSS module.

In some embodiments, periods of the first interval and the second interval may be equal, and the second interval may be offset from the first interval by half the period of the first interval.

In some embodiments, comparing the satellite positioning data to the first dead reckoning positioning data of the first dead reckoning module and to the second dead reckoning positioning data of the second dead reckoning module may include determining whether a first difference between the satellite positioning data and the first dead reckoning positioning data or a second difference between the satellite positioning data and the second dead reckoning module exceeds a threshold. In response to determining that neither the first difference or the second difference exceeds the threshold, the satellite positioning data may be selected as the vehicle position. In response to determining that the first difference exceeds the threshold and the second difference does not exceed the threshold, the first dead reckoning positioning data may be selected as the vehicle position. In response to determining that the second difference exceeds the threshold and the first difference does not exceed the threshold, the second dead reckoning positioning data may be as the vehicle position. In response to determining that both of the first difference and the second difference exceed the threshold, the most recently reset data among the first dead reckoning positioning data and the second dead reckoning positioning data may be selected as the vehicle position.

In some embodiments, periodically resetting the first dead reckoning module, at the first interval, based on the satellite positioning data may include resetting the first dead reckoning module to a current value of the satellite positioning data at the time of reset. In some embodiments, periodically resetting the second dead reckoning module, at the second interval, based on the satellite positioning data may include resetting the second dead reckoning module to a current value of the satellite positioning data at the time of reset.

In some embodiments, the method may further include determining second positioning data, based on the selected one of the satellite positioning data, the first dead reckoning positioning data, and the second dead reckoning positioning data; comparing the second positioning data to the selected one of the satellite positioning data, the first dead reckoning positioning data, and the second dead reckoning positioning data to determine if a failure condition exists; and in response to determining that the failure condition exists, selecting the second positioning data as the vehicle position.

In some embodiments, the satellite positioning data, the first dead reckoning position data, and the second dead reckoning positioning data may be determined by a first electronic control unit (ECU), and the second positioning data may be determined by a second ECU different than the first ECU.

A system is provided. The system includes a memory storing instructions and processing circuitry. The processing circuitry is configured to execute the instructions stored in the memory to determine, using a satellite positioning module, satellite positioning data, periodically reset a first dead reckoning module, at a first interval, based on the satellite positioning data, and periodically reset a second dead reckoning module, at a second interval offset from the first interval, based on the satellite positioning data. The processing circuitry is further configured to execute the instructions to compare the satellite positioning data to first dead reckoning positioning data of the first dead reckoning module and to second dead reckoning positioning data of the second dead reckoning module, and select the satellite positioning data, the first dead reckoning positioning data, or the second dead reckoning positioning data as a vehicle position based on the comparison.

In some embodiments, the processing circuitry may be configured to determine, using the satellite positioning module, the satellite positioning data by fusing data from a GNSS module with data from at least one of an IMU, a wheel speed sensor, and a steering angle sensor to determine the satellite positioning data.

In some embodiments, after the first dead reckoning module is reset, the first dead reckoning positioning data may not be based on the GNSS module, and after the second dead reckoning module is reset, the second dead reckoning positioning data may not be based on the GNSS module.

In some embodiments, periods of the first interval and the second interval may be equal, and the second interval may be offset from the first interval by half the period of the first interval.

In some embodiments, the processing circuitry may be configured to compare the satellite positioning data to the first dead reckoning positioning data of the first dead reckoning module and to the second dead reckoning positioning data of the second dead reckoning module by determining whether a first difference between the satellite positioning data and the first dead reckoning positioning data or a second difference between the satellite positioning data and the second dead reckoning module exceeds a threshold, in response to determining that neither of the first difference and the second difference exceed the threshold, selecting the satellite positioning data as the vehicle position, in response to determining that the first difference exceeds the threshold and the second difference does not exceed the threshold, selecting the first dead reckoning positioning data as the vehicle position, in response to determining that the second difference exceeds the threshold and the first difference does not exceed the threshold, selecting the second dead reckoning positioning data as the vehicle position, and in response to determining that both of the first difference and the second difference exceed the threshold, selecting the most recently reset data among the first dead reckoning positioning data and the second dead reckoning positioning data as the vehicle position.

In some embodiments, the processing circuitry may be configured to periodically reset the first dead reckoning module, at the first interval, based on the satellite positioning data by resetting the first dead reckoning module to a current value of the satellite positioning data at the time of reset, and periodically reset the second dead reckoning module, at the second interval, based on the satellite positioning data by resetting the second dead reckoning module to a current value of the satellite positioning data at the time of reset.

In some embodiments, the processing circuitry may be further configured to determine second positioning data, based on the selected one of the satellite positioning data, the first dead reckoning positioning data, and the second dead reckoning positioning data, compare the second positioning data to the selected one of the satellite positioning data, the first dead reckoning positioning data, and the second dead reckoning positioning data to determine if a failure condition exists, and in response to determining that the failure condition exists, select the second positioning data as the vehicle position.

In some embodiments, the satellite positioning data, the first dead reckoning position data, and the second dead reckoning positioning data may be determined by a first ECU, and the second positioning data may be determined by a second ECU different than the first ECU.

A non-transitory computer-readable medium having non-transitory computer-readable instructions encoded thereon is provided. The instructions, when executed by processing circuitry, cause the processing circuitry to determine, using a satellite positioning module, satellite positioning data, periodically reset a first dead reckoning module, at a first interval, based on the satellite positioning data, and periodically reset a second dead reckoning module, at a second interval offset from the first interval, based on the satellite positioning data, compare the satellite positioning data to first dead reckoning positioning data of the first dead reckoning module and to second dead reckoning positioning data of the second dead reckoning module, and select the satellite positioning data, the first dead reckoning positioning data, or the second dead reckoning positioning data as a position of the vehicle based on the comparison.

In some embodiments, execution of the instructions to determine, using the satellite positioning module, the satellite positioning data may further cause the processing circuitry to fuse data from a GNSS module with data from at least one of an IMU, a wheel speed sensor, and a steering angle sensor to determine the satellite positioning data.

In some embodiments, after the first dead reckoning module is reset, the first dead reckoning positioning data may not be based on the GNSS module, and after the second dead reckoning module is reset, the second dead reckoning positioning data is not based on the GNSS module.

In some embodiments, execution of the instructions to compare the satellite positioning data to the first dead reckoning positioning data of the first dead reckoning module and to the second dead reckoning positioning data of the second dead reckoning module may further cause the processing circuitry to determine whether a first difference between the satellite positioning data and the first dead reckoning positioning data or a second difference between the satellite positioning data and the second dead reckoning module exceeds a threshold, in response to determining that neither of the first difference and the second difference exceed the threshold, select the satellite positioning data as the vehicle position, in response to determining that the first difference exceeds the threshold and the second difference does not exceed the threshold, select the first dead reckoning positioning data as the vehicle position, in response to determining that the second difference exceeds the threshold and the first difference does not exceed the threshold, select the second dead reckoning positioning data as the vehicle position, and in response to determining that both of the first difference and the second difference exceed the threshold, select the most recently reset data among the first dead reckoning positioning data and the second dead reckoning positioning data as the vehicle position.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
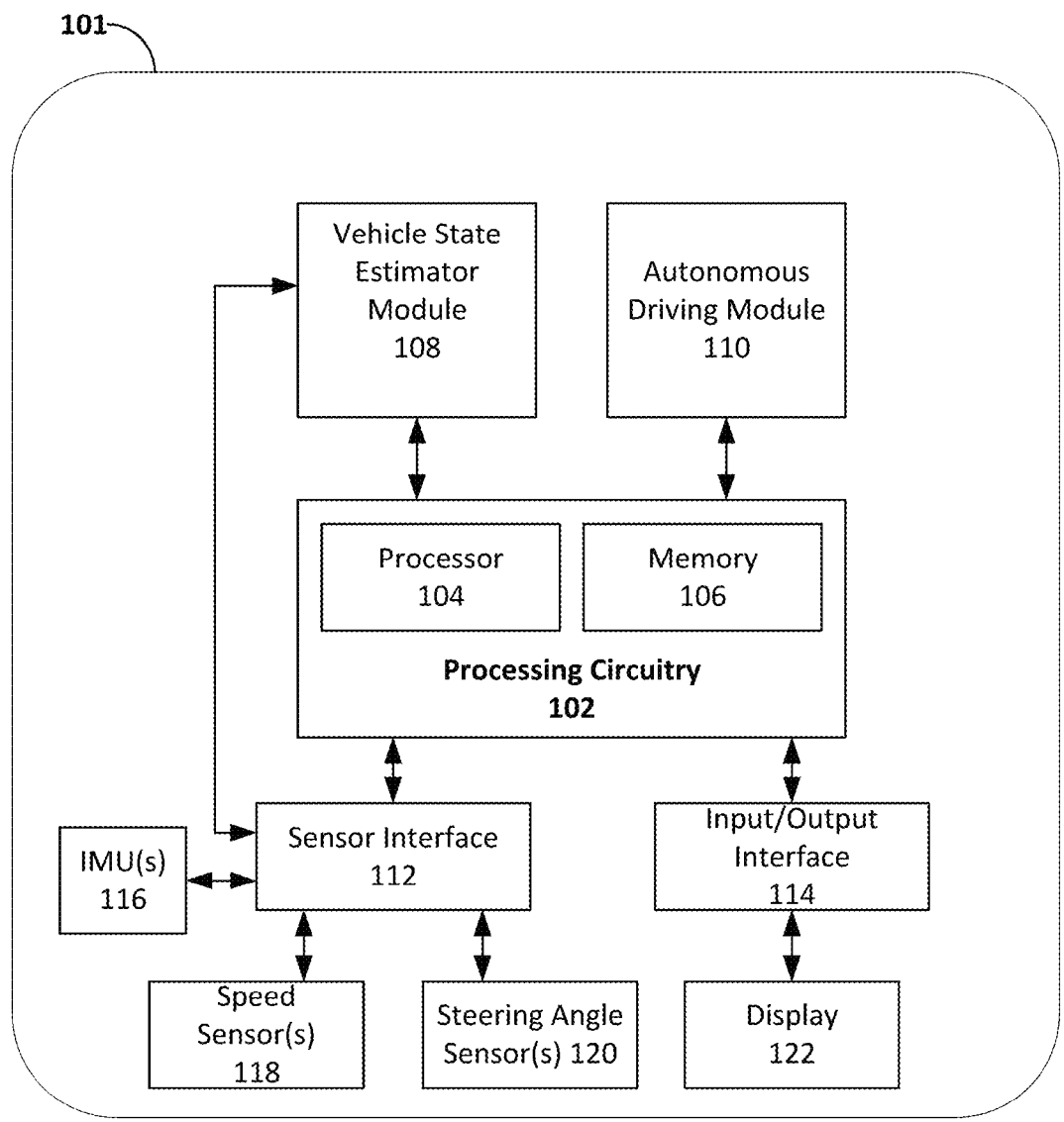
FIG. 1 shows a block diagram of components of a system of a vehicle configured to provide position information (e.g., to enable autonomous or semi-autonomous driving), in accordance with some embodiments of the present disclosure.

FIG. 1 shows a block diagram of components of a system of vehicle 101 configured to provide position information (e.g., to enable autonomous or semi-autonomous driving), in accordance with some embodiments of the present disclosure. Vehicle 101 may be a car (e.g., a coupe, a sedan, a truck, an SUV, a bus), a motorcycle, an aircraft (e.g., a drone), a watercraft (e.g., a boat), or any other type of vehicle or apparatus the requires reliable position information.

Vehicle 101 may comprise processing circuitry 102, which may comprise processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of vehicle 101. In some embodiments, processor 104 alone may be referred to as processing circuitry 102 of vehicle 101. Memory 106 may comprise hardware elements for non-transitory storage of commands or instructions, that, when executed by processor 104, cause processor 104 to operate vehicle 101 in accordance with embodiments described above and below. Processing circuitry 102 may be communicatively connected to components of vehicle 101 via one or more wires, or via wireless connection. In some embodiments, vehicle 101 may comprise any of a variety of suitable systems used for controlling and operating a vehicle. For example, vehicle 101 may include vehicle state estimator module 108 for determining positioning information, autonomous driving module 110 for autonomously or semi-autonomously operating vehicle 101, sensor interface 112 connected to a plurality of vehicle sensors (e.g., including IMU(s) 116, speed sensor(s) 118 and steering angle sensor(s) 120), and input/output interface 114 connected to display 120. Although only a single IMU 116, speed sensor 116, and steering angle sensor 120 are shown, it should be understood that vehicle 101 may include a plurality of each of these sensors (e.g., redundant sensors), as explained in greater detail with reference to FIG. 2. Vehicle 101 may further include a plurality of software/hardware modules to operate in accordance with the embodiments described below. In some embodiments, different modules may be implemented on the same or different ECUs.

As described in further detail below, vehicle state estimator module 108 may determine the positioning data of vehicle 101 and detect and compensate for errors in GNSS data. The determined positioning data may be provided to autonomous driving module 110 to enable autonomous or semi-autonomous driving of vehicle 101.

It should be appreciated that FIG. 1 shows only some of the components of vehicle 101, and it will be understood that vehicle 101 also includes other elements commonly found in vehicles (e.g., autonomous and semi-autonomous vehicles), e.g., a motor, brakes, wheels, wheel controls, turn signals, windows, doors, cameras and other sensors, communication circuitry, etc.

Figure 2:
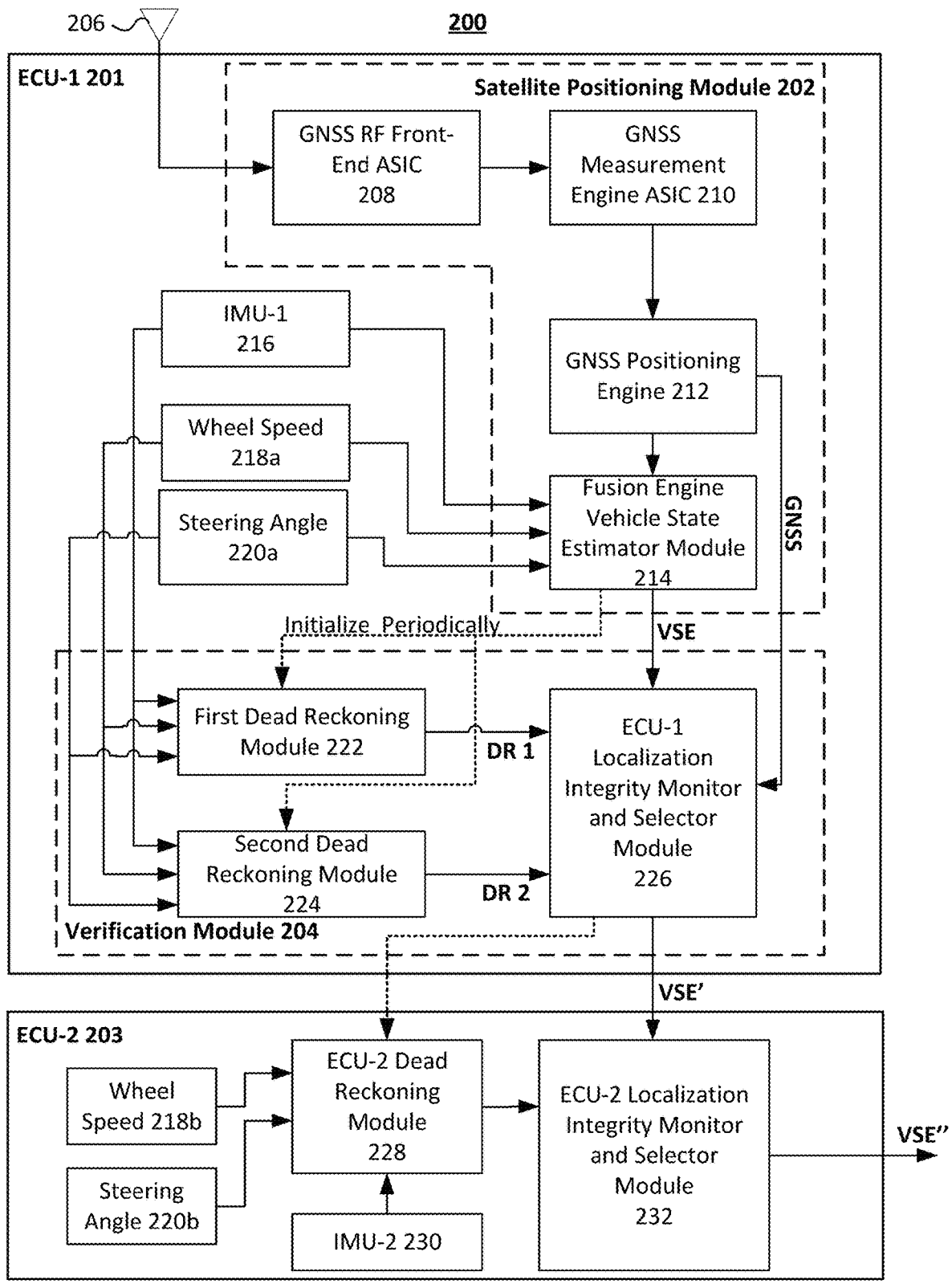
FIG. 2 shows a block diagram of an illustrative vehicle state estimator module, in accordance with some embodiments of the present disclosure.

FIG. 2 shows a block diagram of an illustrative vehicle state estimator module 200, in accordance with some embodiments of the present disclosure. Vehicle state estimator module 200 may correspond to vehicle state estimator module 108 of FIG. 1 and may be implemented in part by certain elements illustrated in FIG. 1 (e.g., processing circuitry 102). For example, vehicle state estimator module 200 may be implemented using software running on one or more general-purpose or specialized processors (e.g., ECUs or electronic control modules (ECMs)). In one embodiment, vehicle state estimator module 200 may be implemented by a plurality of devices (e.g., modules) and a plurality of software components. For example, as shown, vehicle state estimator module 200 may be implemented by two separate ECUs (e.g., ECU-1 201 and ECU-2 203). In some embodiments, as described in greater detail below, ECU-2 203 may be omitted.

As shown, ECU-1 201 includes satellite positioning module 202 and verification module 204. Satellite positioning module 202 may be in communication with multiple satellites through an antenna (e.g., antenna 206). As shown, satellite positioning module 202 may include GNSS radio frequency (RF) front-end application-specific integrated circuit (ASIC) 208, GNSS measurement engine ASIC 210, and GNSS positioning engine 212 for determining GNSS positioning. Fusion engine vehicle state estimator module 214 may fuse other sensor data from IMU-1 216, first wheel speed data 218a (e.g., from a first speed sensor 118), and first steering angle data 220a (e.g., from a first steering angle sensor 120) to provide a VSE ("VSE" in FIG. 2) in a loosely, tightly, or deeply coupled fashion, as understood by those skilled in the art. Thus, during GNSS outages, ECU-1 201 may continue to provide the VSE (e.g., based on the fused sensor data). In some embodiments, satellite positioning module 202 may be configured to operate in different accuracy modes depending on the desired setup for a particular application (e.g., stand-alone, differential, real-time kinematic). However, the GNSS (e.g., determined by GNSS positioning engine 212) may be susceptible to errors (e.g., hardware errors and interference). Accordingly, in order to avoid positioning errors, the output of satellite positioning module 202 is provided to verification module 204.

As shown, verification module 204 may include two separate dead reckoning modules (e.g., first dead reckoning module 222 and second dead reckoning module 224) that receive periodic resets from GNSS+IMU fused output (e.g., "VSE" in FIG. 2) and afterward use only IMU-1 216 and first wheel odometry data (e.g., first wheel speed data 218a and first steering angle data 220a) to compute the vehicle state. That is, each of first and second dead reckoning modules 222, 224 continues to calculate the position of the vehicle using the initially reset position provided by satellite positioning module 202. First and second dead reckoning modules 222, 224 may receive such resets at a same period, but with staggered initialization, e.g., the second dead reckoning module 224 is delayed by half of the period with respect to the first dead reckoning module 222. In this way, if the position determined by GNSS positioning engine 212 suddenly jumps (e.g., due to a hardware failure or multi-path interference from the environment), verification module 204 may detect the error by a comparison between the outputs ("DR1" and "DR2" in FIG. 2) of first and second dead reckoning modules 222, 224, and the VSE performed by ECU-1 localization integrity monitor and selector module 226, as explained in greater detail below with reference to FIG. 3.

In some embodiments, vehicle state estimator module 200 may further include a second verification module implemented by a separate ECU (ECU-2 203). The second verification module may include a dead reckoning module (e.g., ECU-2 dead reckoning module 228) that is periodically reset with the output of the first verification module (verification module 204). Based on this periodically reset position, ECU-2 dead reckoning module 228 may determine a vehicle position based on IMU-2 230 and second wheel odometry data (e.g., second wheel speed data 218b and second steering angle data 220b). In some embodiments, the second wheel odometry data may be provided sensors different than the sensors used to provide the first wheel odometry data discussed above. For example, second wheel speed data 218b may be provided from a second speed sensor 118 and second steering angle data 220b may be provided from a second steering angle sensor 120. Put another way, each ECU (e.g., ECU-1 and ECU-2) may have a dedicated set of sensors (e.g., redundant sensors). ECU-2 localization integrity monitor and selector module 232 may compare VSE' (i.e., the output of ECU-1 localization integrity monitor and selector module 226) with the output of ECU-2 dead reckoning module 228 to determine if an error in ECU-1 201 has occurred (e.g., hardware failure, loss of power, etc.). In such a situation, as explained in further detail in FIG. 4, the output of ECU-2 dead reckoning module 228 may be selected as the output by ECU-2 localization integrity monitor and selector module 232 ("VSE" in FIG. 2) so that autonomous driving module 110 may hand back control to a driver in a safe and orderly manner (or, e.g., end an autonomous driving mode of vehicle 101).

Figure 3:
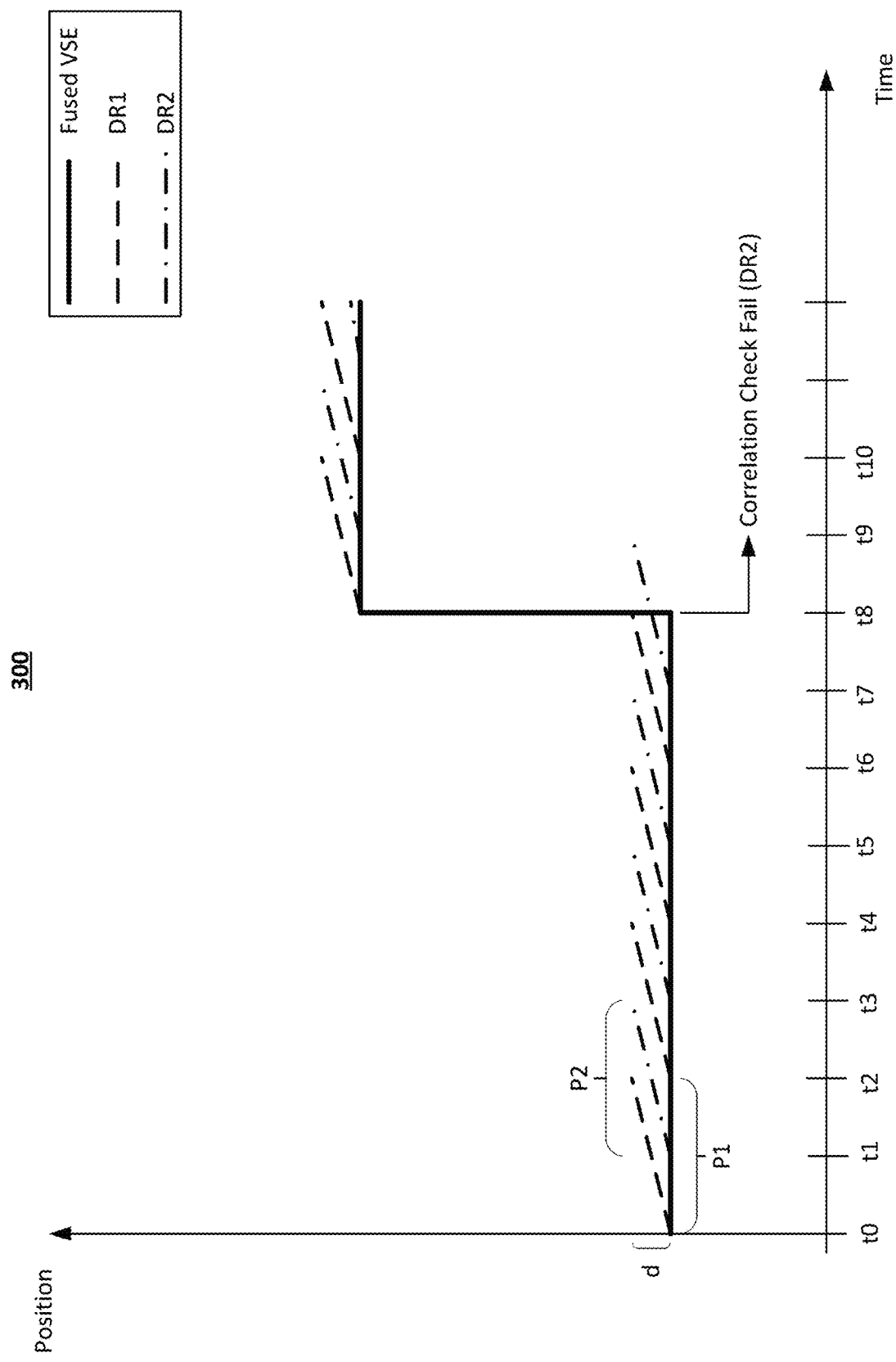
FIG. 3 shows an illustrative diagram for detecting erroneous GNSS data, in accordance with some embodiments of the present disclosure.

FIG. 3 shows an illustrative diagram 300 for detecting erroneous GNSS data, in accordance with some embodiments of the present disclosure. As shown, the "fused VSE" corresponds to the position (e.g., satellite positioning data) output by satellite positioning module 202 of FIG. 2. The fused VSE may be continually refreshed to reflect the current determined position of vehicle 101. As explained above, first dead reckoning module 222 of FIG. 2 may be periodically reset, at a first interval ("P1" in FIG. 3), based on the current position determined by satellite positioning module 202 (e.g., the fused GNSS+IMS solution—fused VSE). Once first dead reckoning module 222 is reset, first dead reckoning module 222 continues to estimate the current vehicle position without relying on any further GNSS data. For example, first dead reckoning module 222 determines the current vehicle position based on IMU-1 216 and wheel odometry data (e.g., wheel speed data 218 and steering angle data 220). Similarly, second dead reckoning module 224 of FIG. 2 may also be periodically reset, at a second interval ("P2" in FIG. 3) offset from the first interval P1, based on the current position determined by satellite positioning module 202 (e.g., the fused GNSS+IMS solution—fused VSE). Once second dead reckoning module 224 is reset, second dead reckoning module 224 continues to estimate the current vehicle position without relying on any further GNSS data. As shown, each solution from the first and second dead reckoning modules 222, 224 is allowed to drift from the original position. However, because each of first and second dead reckoning modules 222, 224 are periodically reset (e.g., once every 30 seconds), the drift (e.g., positioning error) may be limited (e.g., to 0.5 meters). However, this is only one example, and periods (P1 and P2) may be adjusted based on the requirements of a particular application (e.g., to limit drift of the position determined by the dead reckoning modules).

As explained above, the outputs (e.g., positioning solutions) of satellite positioning module 202 ("the fused VSE") and first and second dead reckoning modules 222, 224 ("DR1" and "DR2" in FIG. 2) are compared by ECU-1 localization integrity monitor and selector module 226 to determine an error in the GNSS data. For example, the fused VSE ("VSE" in FIG. 2) is compared to each of DR1 and DR2 to determine if the difference between the positioning solutions exceeds a predetermined threshold (e.g., indicating an error in the GNSS data). Because the initialization of first and second dead reckoning modules 222, 224 is offset, verification module 204 is able to detect an error in the GNSS data, even if the error occurs (e.g., the fused VSE jumps) at the moment that one of the first and second dead reckoning modules is reset. For example, as shown, at time t8, the fused VSE position jumps (e.g., due to multi-path interference). Because first dead reckoning module 222 is reset when the fused VSE position jumps (e.g., when the positioning error occurs), the error is not detected by first dead reckoning module 222 (e.g., the difference between the positioning solutions of satellite positioning module 202 and first dead reckoning module 222 does not exceed a threshold). However, because the positioning solution of second dead reckoning module 224 is not based on the GNSS data (e.g., after being reset when the GNSS data was still valid), the ECU-1 localization integrity monitor and selector module 226 determines that the difference between the positioning solutions of satellite positioning module 202 and second dead reckoning module 224 exceeds the threshold and determines that the GNSS data is corrupted. Based on this determination, ECU-1 localization integrity monitor and selector module 226 selects the positioning solution of second dead reckoning module 224 and outputs this solution as the vehicle position ("VSE'") instead of the positioning solution of satellite positioning module 202. In some embodiments, ECU-1 localization integrity monitor and selector module 226 may further provide an instruction to the autonomous driving module 110 of FIG. 1 to hand back control of vehicle 101 to the driver (e.g., before the positioning solution of second dead reckoning module 224 is reset), while still providing reliable positioning solution to the autonomous driving module 110 before the handoff. That is, in some embodiments, once the error is detected, the positioning solution of the second dead reckoning module 224 should not be reset until the handoff to the driver is complete and another external validation is available.

In some embodiments, the positioning solution output by verification module 204 ("VSE'" in FIG. 2) may be provided to the second ECU (ECU-2 203) to determine if a failure condition existed in the first ECU (ECU-1 201) (e.g., power loss), as explained in further detail with reference to FIG. 4.

Figure 4:
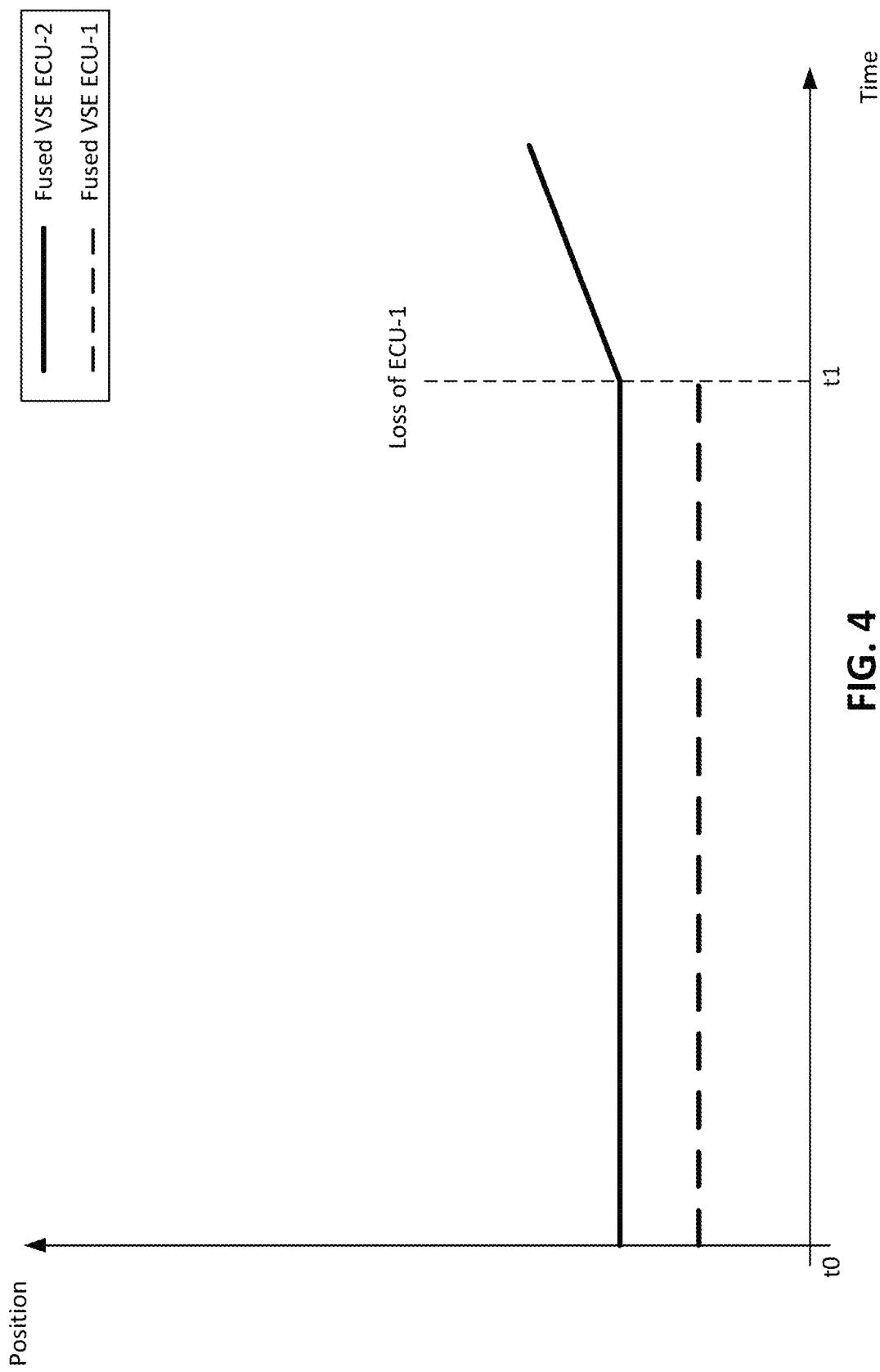
FIG. 4 shows an illustrative diagram for detecting a hardware failure of an ECU, in accordance with some embodiments of the present disclosure.

FIG. 4 shows an illustrative diagram 400 for detecting a hardware failure of the first ECU (e.g., "ECU-1 201" of FIG. 2), in accordance with some embodiments of the present disclosure. As shown, at time t1, the fused VSE of ECU-1 201 of FIG. 2 ("VSE'" in FIG. 2) is no longer received by ECU-2 203 (e.g., due to a hardware failure or power failure of ECU-1 201). In this case, ECU-2 203 detects the error and outputs the positioning solution of ECU-2 203 ("VSE'" in FIG. 2), based on the comparison by ECU-2 localization integrity monitor and selector module 232 (e.g., instead of the positioning solution of ECU-1 201). Thus, vehicle state estimator module 200 may continue to provide a reliable positioning solution to the autonomous driving module 110 before the handoff (e.g., due to the detected failure).

Figure 5:
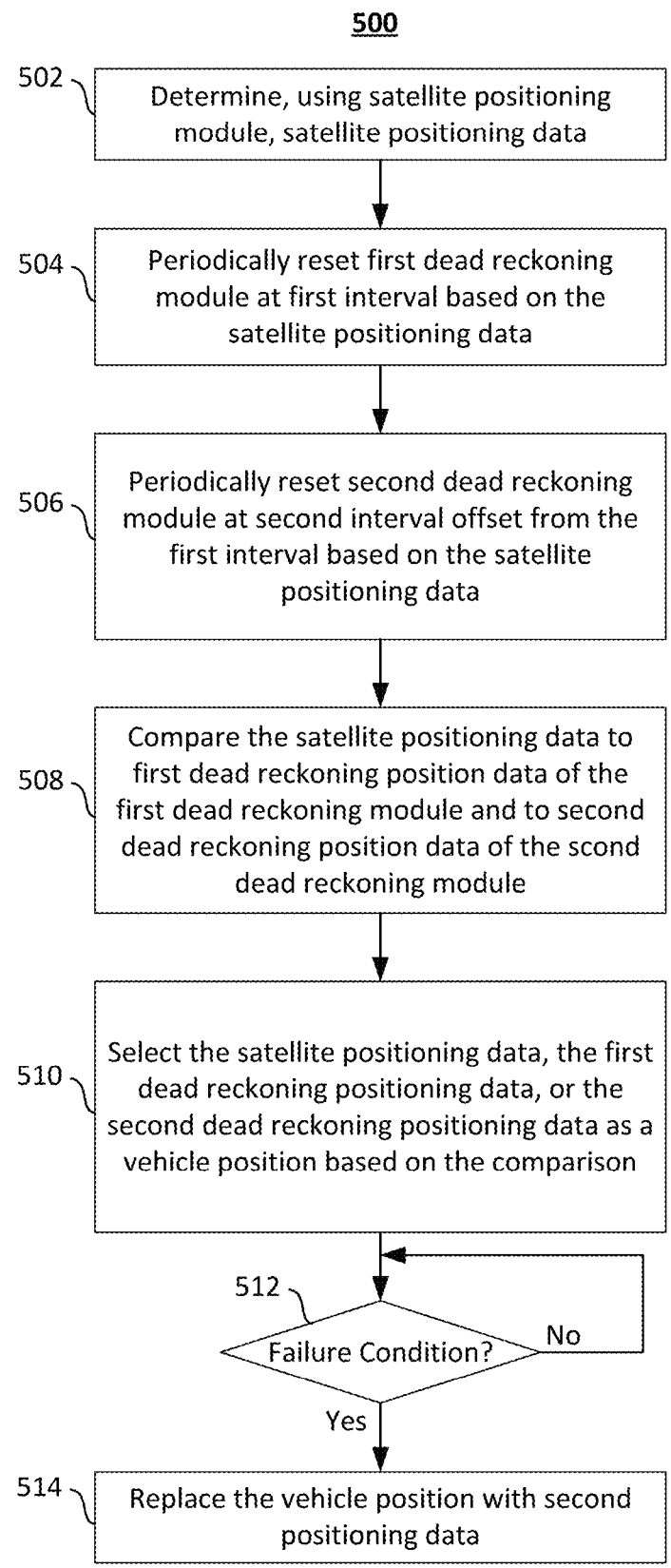
FIG. 5 shows a flowchart of an illustrative process for selecting data as a vehicle position, in accordance with some embodiments of the present disclosure.

FIG. 5 shows a flowchart of an illustrative process 500 for selecting data as a vehicle position, in accordance with some embodiments of the present disclosure. Process 500 may be performed by vehicle state estimator module 200 and/or the processing circuitry 102.

At 502, vehicle state estimator module 200 determines, using a satellite positioning module, satellite positioning data. For example, the vehicle state estimator module 200 fuses GNSS data (e.g., determined by GNSS positioning engine 212 of FIG. 2) and other sensor data (e.g., from an IMU and/or wheel odometry) to determine satellite positioning data (e.g., a current VSE).

At 504, vehicle state estimator module 200 periodically resets a first dead reckoning module (e.g., first dead reckoning module 222 of FIG. 2), at a first interval, based on the satellite positioning data (e.g., the current VSE at the time of reset). For example, as shown in FIG. 3, first dead reckoning module 222 is reset at a first interval P1.

At 506, vehicle state estimator module 200 periodically resets a second dead reckoning module (e.g., second dead reckoning module 222 of FIG. 2), at a second interval offset from the first interval, based on the satellite positioning data (e.g., the current VSE at the time of reset). For example, as shown in FIG. 3, first dead reckoning module 224 is reset at a second interval P2. In some embodiments, periods of the first interval P1 and the second interval are equal, wherein the second interval P1 is offset from the first interval P2 by half the period of the first interval P1.

At 508, vehicle state estimator module 200 compares the satellite positioning data to first dead reckoning positioning data of the first dead reckoning unit and to second dead reckoning positioning data of the second dead reckoning unit. For example, as shown in FIG. 2, ECU-1 localization integrity monitor and selector module 226 compares the VSE from satellite positioning module 202 to the outputs DR1 and DR2 of first and second dead reckoning modules 222, 224.

At 510, vehicle state estimator module 200 selects the satellite positioning data, the first dead reckoning positioning data, or the second dead reckoning positioning data as a vehicle position based on the comparison. For example, as shown in FIG. 2, ECU-1 localization integrity monitor and selector module 226 selects one of VSE, DR1, and DR2 as the vehicle position (VSE').

At 512, vehicle state estimator module 200 determines if a failure condition exists. For example, ECU-2 203 of FIG. 3 monitors the vehicle position VSE' and determines if the vehicle position is no longer received (e.g., due to a power or hardware failure of ECU-1 101).

At 514, in response to determining that a failure condition exists ("Yes" at 512), vehicle state estimator module 200 replaces the selected vehicle position (VSE') with second positioning data (e.g., determined by ECU-2 dead reckoning module 228). For example, vehicle state estimator module 200 may replace the selected vehicle position with data output from a dead reckoning module initialed with the selected vehicle position.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. For example, steps 512 and 514 may be omitted. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

What is claimed is:

1. A method, comprising:
    determining, using a satellite positioning module, satellite positioning data;
    periodically resetting a first dead reckoning module, at a first interval, based on the satellite positioning data;
    periodically resetting a second dead reckoning module, at a second interval offset from the first interval, based on the satellite positioning data;
    comparing the satellite positioning data to first dead reckoning positioning data of the first dead reckoning module and to second dead reckoning positioning data of the second dead reckoning module; and
    selecting the satellite positioning data, the first dead reckoning positioning data, or the second dead reckoning positioning data as a vehicle position based on the comparison.

2. The method of claim 1, wherein determining the satellite positioning data comprises fusing data from a global navigation satellite system (GNSS) module and from at least one of an internal measurement unit (IMU), a wheel speed sensor, and a steering angle sensor to determine the satellite positioning data.

3. The method of claim 2, wherein:
    after resetting the first dead reckoning module, the first dead reckoning positioning data is not based on the GNSS module; and
    after resetting the second dead reckoning module, the second dead reckoning positioning data is not based on the GNSS module.

4. The method of claim 1, wherein:
    periods of the first interval and the second interval are equal; and
    the second interval is offset from the first interval by half the period of the first interval.

5. The method of claim 1, wherein comparing the satellite positioning data to the first dead reckoning positioning data of the first dead reckoning module and to the second dead reckoning positioning data of the second dead reckoning module comprises:
    determining whether a first difference between the satellite positioning data and the first dead reckoning positioning data or a second difference between the satellite positioning data and the second dead reckoning module exceeds a threshold;
    in response to determining that neither of the first difference and the second difference exceed the threshold, selecting the satellite positioning data as the vehicle position;
    in response to determining that the first difference exceeds the threshold and the second difference does not exceed the threshold, selecting the first dead reckoning positioning data as the vehicle position;
in response to determining that the second difference exceeds the threshold and the first difference does not exceed the threshold, selecting the second dead reckoning positioning data as the vehicle position; and
in response to determining that both of the first difference and the second difference exceed the threshold, selecting the most recently reset data among the first dead reckoning positioning data and the second dead reckoning positioning data as the vehicle position.

6. The method of claim 1, wherein:
periodically resetting the first dead reckoning module, at the first interval, based on the satellite positioning data comprises resetting the first dead reckoning module to a current value of the satellite positioning data at the time of reset; and
periodically resetting the second dead reckoning module, at the second interval, based on the satellite positioning data comprises resetting the second dead reckoning module to a current value of the satellite positioning data at the time of reset.

7. The method of claim 1, further comprising:
determining second positioning data, based on the selected one of the satellite positioning data, the first dead reckoning positioning data, and the second dead reckoning positioning data;
comparing the second positioning data to the selected one of the satellite positioning data, the first dead reckoning positioning data, and the second dead reckoning positioning data to determine if a failure condition exists; and
in response to determining that the failure condition exists, selecting the second positioning data as the vehicle position.

8. The method of claim 7, wherein:
the satellite positioning data, the first dead reckoning positioning data, and the second dead reckoning positioning data are determined by a first electronic control unit (ECU); and
the second positioning data is determined by a second ECU different than the first ECU.

9. A system, comprising:
a memory storing instructions; and
processing circuitry configured to execute the instructions stored in the memory to:
determine, using a satellite positioning module, satellite positioning data;
periodically reset a first dead reckoning module, at a first interval, based on the satellite positioning data;
periodically reset a second dead reckoning module, at a second interval offset from the first interval, based on the satellite positioning data;
compare the satellite positioning data to first dead reckoning positioning data of the first dead reckoning module and to second dead reckoning positioning data of the second dead reckoning module; and
select the satellite positioning data, the first dead reckoning positioning data, or the second dead reckoning positioning data as a vehicle position based on the comparison.

10. The system of claim 9, wherein the processing circuitry is configured to determine, using the satellite positioning module, the satellite positioning data by fusing data from a global navigation satellite system (GNSS) module with data from at least one of an internal measurement unit (IMU), a wheel speed sensor, and a steering angle sensor to determine the satellite positioning data.

11. The system of claim 10, wherein:
after the first dead reckoning module is reset, the first dead reckoning positioning data is not based on the GNSS module; and
after the second dead reckoning module is reset, the second dead reckoning positioning data is not based on the GNSS module.

12. The system of claim 9, wherein:
periods of the first interval and the second interval are equal; and
the second interval is offset from the first interval by half the period of the first interval.

13. The system of claim 9, wherein the processing circuitry is configured to compare the satellite positioning data to the first dead reckoning positioning data of the first dead reckoning module and to the second dead reckoning positioning data of the second dead reckoning module by:
determining whether a first difference between the satellite positioning data and the first dead reckoning positioning data or a second difference between the satellite positioning data and the second dead reckoning module exceeds a threshold;
in response to determining that neither of the first difference and the second difference exceed the threshold, selecting the satellite positioning data as the vehicle position;
in response to determining that the first difference exceeds the threshold and the second difference does not exceed the threshold, selecting the first dead reckoning positioning data as the vehicle position;
in response to determining that the second difference exceeds the threshold and the first difference does not exceed the threshold, selecting the second dead reckoning positioning data as the vehicle position; and
in response to determining that both of the first difference and the second difference exceed the threshold, selecting the most recently reset data among the first dead reckoning positioning data and the second dead reckoning positioning data as the vehicle position.

14. The system of claim 9, wherein the processing circuitry is configured to:
periodically reset the first dead reckoning module, at the first interval, based on the satellite positioning data by resetting the first dead reckoning module to a current value of the satellite positioning data at the time of reset; and
periodically reset the second dead reckoning module, at the second interval, based on the satellite positioning data by resetting the second dead reckoning module to a current value of the satellite positioning data at the time of reset.

15. The system of claim 9, wherein the processing circuitry is further configured to:
determine second positioning data, based on the selected one of the satellite positioning data, the first dead reckoning positioning data, and the second dead reckoning positioning data;
compare the second positioning data to the selected one of the satellite positioning data, the first dead reckoning positioning data, and the second dead reckoning positioning data to determine if a failure condition exists; and
in response to determining that the failure condition exists, select the second positioning data as the vehicle position.

16. The system of claim 15, wherein:
the satellite positioning data, the first dead reckoning positioning data, and the second dead reckoning positioning data are determined by a first electronic control unit (ECU); and
the second positioning data is determined by a second ECU different than the first ECU.

17. A non-transitory computer-readable medium having non-transitory computer-readable instructions encoded thereon that, when executed by processing circuitry, cause the processing circuitry to:
determine, using a satellite positioning module, satellite positioning data;
periodically reset a first dead reckoning module, at a first interval, based on the satellite positioning data;
periodically reset a second dead reckoning module, at a second interval offset from the first interval, based on the satellite positioning data;
compare the satellite positioning data to first dead reckoning positioning data of the first dead reckoning module and to second dead reckoning positioning data of the second dead reckoning module; and
select the satellite positioning data, the first dead reckoning positioning data, or the second dead reckoning positioning data as a vehicle position based on the comparison.

18. The non-transitory computer-readable medium of claim 17, wherein execution of the instructions to determine, using the satellite positioning module, the satellite positioning data further causes the processing circuitry to fuse data from a global navigation satellite system (GNSS) module with data from at least one of an internal measurement unit (IMU), a wheel speed sensor, and a steering angle sensor to determine the satellite positioning data.

19. The non-transitory computer-readable medium of claim 17, wherein:
after the first dead reckoning module is reset, the first dead reckoning positioning data is not based on the GNSS module; and
after the second dead reckoning module is reset, the second dead reckoning positioning data is not based on the GNSS module.

20. The non-transitory computer-readable medium of claim 17, wherein execution of the instructions to compare the satellite positioning data to the first dead reckoning positioning data of the first dead reckoning module and to the second dead reckoning positioning data of the second dead reckoning module further causes the processing circuitry to:
determine whether a first difference between the satellite positioning data and the first dead reckoning positioning data or a second difference between the satellite positioning data and the second dead reckoning module exceeds a threshold;
in response to determining that neither of the first difference and the second difference exceed the threshold, select the satellite positioning data as the vehicle position;
in response to determining that the first difference exceeds the threshold and the second difference does not exceed the threshold, select the first dead reckoning positioning data as the vehicle position;
in response to determining that the second difference exceeds the threshold and the first difference does not exceed the threshold, select the second dead reckoning positioning data as the vehicle position; and
in response to determining that both of the first difference and the second difference exceed the threshold, select the most recently reset data among the first dead reckoning positioning data and the second dead reckoning positioning data as the vehicle position.

\* \* \* \* \*